United States Patent
Gallegos-Lopez et al.

(10) Patent No.: US 8,896,245 B2
(45) Date of Patent: Nov. 25, 2014

(54) METHODS, SYSTEMS AND APPARATUS FOR GENERATING VOLTAGE COMMAND SIGNALS FOR CONTROLLING OPERATION OF AN ELECTRIC MACHINE

(75) Inventors: Gabriel Gallegos-Lopez, Lomita, CA (US); Milun Perisic, Cypress, CA (US)

(73) Assignee: GM Global Technology Operations LLC., Detroit, MI (US)

( * ) Notice: Subject to any disclaimer, the term of this patent is extended or adjusted under 35 U.S.C. 154(b) by 178 days.

(21) Appl. No.: 13/430,389

(22) Filed: Mar. 26, 2012

(65) Prior Publication Data
US 2013/0249457 A1    Sep. 26, 2013

(51) Int. Cl.
H02P 21/00    (2006.01)
H02P 21/10    (2006.01)
H02P 27/00    (2006.01)

(52) U.S. Cl.
USPC ............... 318/400.02; 318/400.01; 318/800; 318/812

(58) Field of Classification Search
None
See application file for complete search history.

(56) References Cited

U.S. PATENT DOCUMENTS

| 2003/0003965 | A1* | 1/2003 | Gough | 455/567 |
|---|---|---|---|---|
| 2005/0212471 | A1* | 9/2005 | Patel et al. | 318/432 |
| 2009/0015286 | A1* | 1/2009 | Kitabatake et al. | 324/763 |
| 2009/0102403 | A1 | 4/2009 | Lule | |
| 2010/0201302 | A1 | 8/2010 | Lyden et al. | |
| 2013/0033205 | A1* | 2/2013 | Furukawa et al. | 318/400.02 |
| 2013/0066501 | A1* | 3/2013 | Oyama et al. | 701/22 |
| 2013/0088905 | A1* | 4/2013 | Lee et al. | 363/131 |
| 2013/0169202 | A1* | 7/2013 | Schulz et al. | 318/400.02 |

FOREIGN PATENT DOCUMENTS

JP    2009229602 A    10/2009

OTHER PUBLICATIONS

German Patent and Trade Mark Office, Office Action for German Patent Application No. 10 2013 203 505.5, mailed Nov. 19, 2013.

* cited by examiner

*Primary Examiner* — Eduardo Colon Santana
*Assistant Examiner* — Devon Joseph
(74) *Attorney, Agent, or Firm* — Ingrassia Fisher & Lorenz, P.C.

(57) ABSTRACT

Embodiments of the present disclosure relate to methods, systems and apparatus for generating voltage command signals for controlling operation of an electric machine. The disclosed embodiments can reduce current and torque oscillation, which can in turn improve machine efficiency and performance, as well as utilization of the DC voltage source.

21 Claims, 11 Drawing Sheets

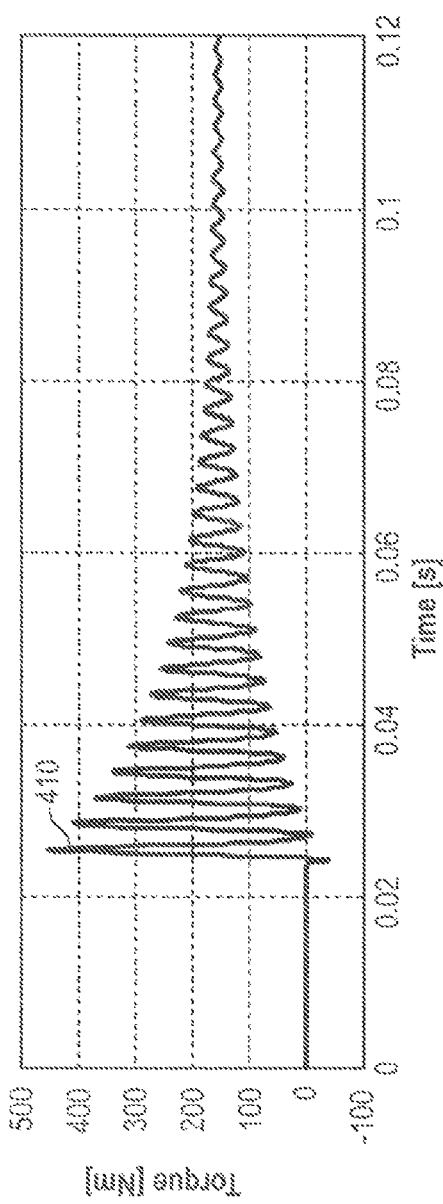
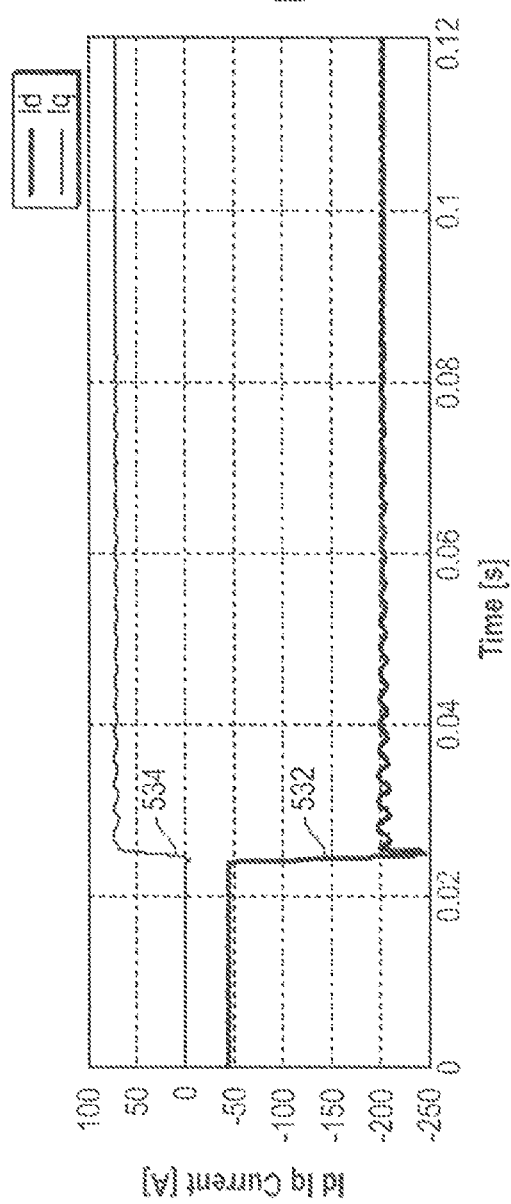
FIG. 4C
FIG. 5A

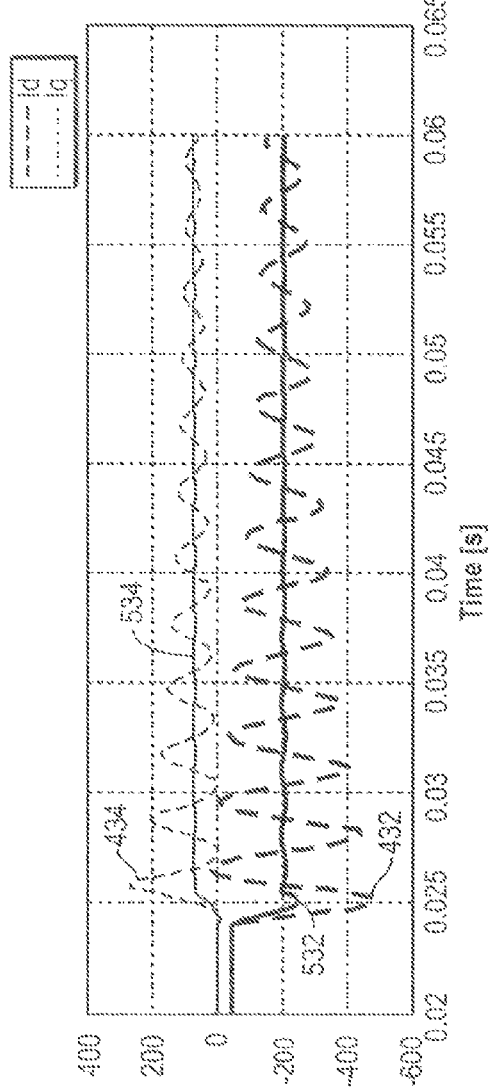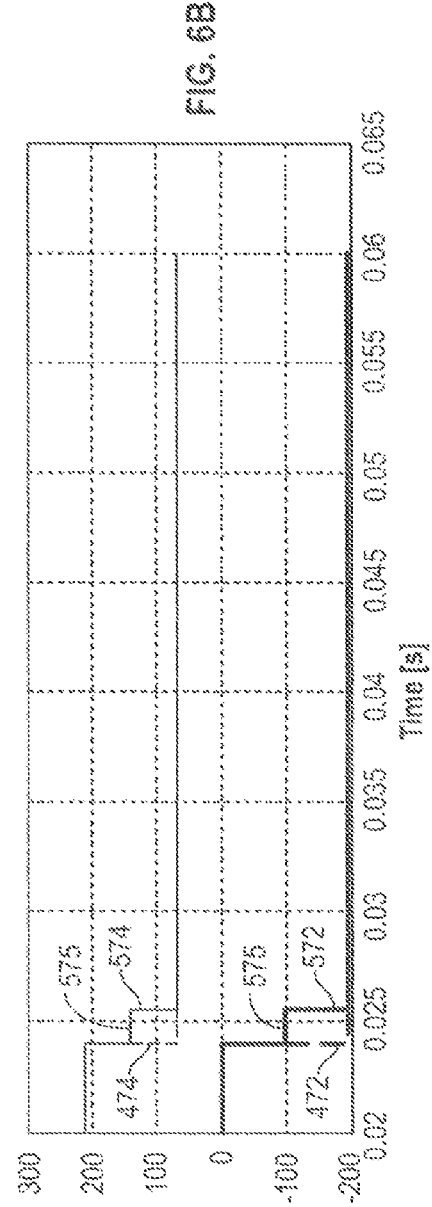
FIG. 6A
FIG. 6B

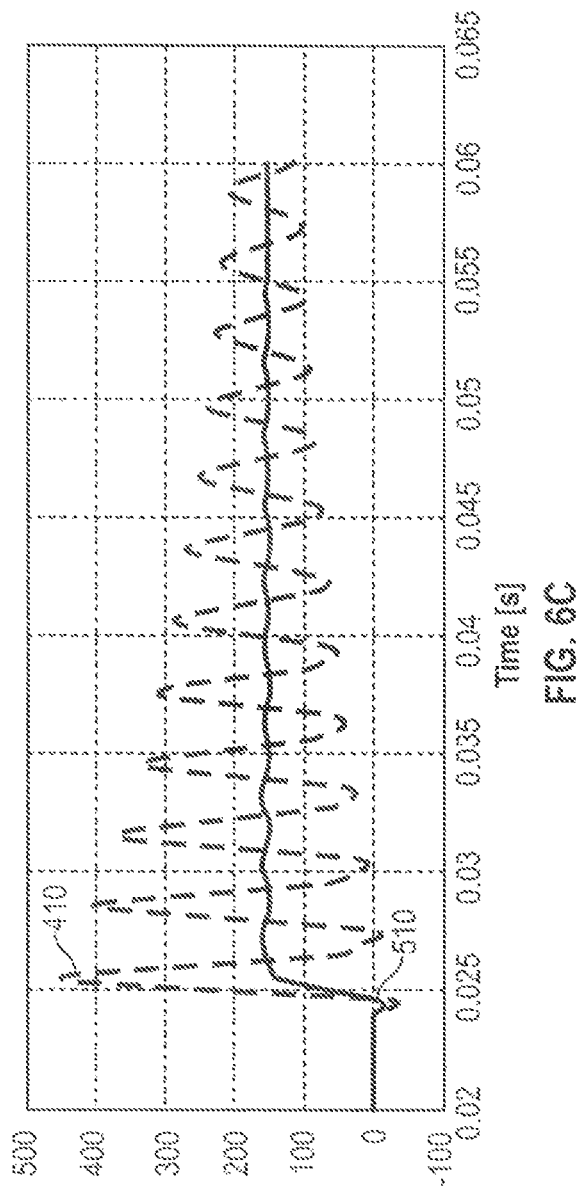

METHODS, SYSTEMS AND APPARATUS FOR GENERATING VOLTAGE COMMAND SIGNALS FOR CONTROLLING OPERATION OF AN ELECTRIC MACHINE

TECHNICAL FIELD

The technical field generally relates to controlling operation of multi-phase systems, and more particularly relate to methods, systems and apparatus for generating voltage command signals for controlling operation of an electric machine.

BACKGROUND

In recent years, advances in technology, as well as ever evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use an electric motor, perhaps in combination with another actuator, to drive the wheels.

Hybrid and electric vehicles (HEVs) typically include an electric traction drive system that includes at least one alternating current (AC) electric motor which is driven by a power inverter module (PIM) with power from a direct current (DC) power source, such as a storage battery. Motor windings of the AC electric motor can be coupled to inverter sub-modules of the PIM. Each inverter sub-module includes a pair of switches that switch in a complementary manner to perform a rapid switching function to convert the DC power to AC power. A pulse width modulation (PWM) module receives voltage command signals and applies PWM waveforms to the voltage command signals to control pulse width modulation of the voltage command signals and generate switching vector signals that are provided to the inverter sub-modules of the inverter module. When the switching vector signals are applied, each pair of switches in each of the inverter sub-module switch in a complementary manner to perform a rapid switching function to convert the DC power to AC power. This AC power drives the AC electric motor, which in turn drives a shaft of HEV's drivetrain.

Vector Control

Many modern high performance AC motor drives use the principle of field oriented control (FOC) or "vector" control to control operation of the AC electric motor. In particular, vector control is often used in variable frequency drives to control currents fed to an AC electric motor so that angular velocity of motor's rotor can be controlled and hence the torque applied to a shaft by the AC electric motor can be controlled. In short, stator phase currents are measured and converted into a corresponding complex space vector. This current vector is then transformed to a coordinate system rotating with the rotor of the AC electric motor. Vector control requires angular position information for the rotor (i.e., the mechanical rotational angular position of rotor relative to the "stator" or motor windings). Angular position information is normally obtained via a feedback device (e.g., angular position or speed sensor). However, in some systems, sensorless control techniques can be used to provide angular position and/or angular frequency/speed information.

Responses During a Fault Condition: Three-Phase Short Versus Open Response

As noted above, during normal operation the switches in each inverter module are operated in a complementary manner such that when one is switched on, the other is switched off, and vice-versa. However, during many different types of fault conditions, it is desirable to deviate from normal complementary operation and to apply either an open-circuit fault response or a short-circuit fault response at the inverter module to minimize the electric machine's torque response or to avoid uncontrolled regeneration at high speed where the back-EMF might be higher than the voltage source.

During an open-circuit response, all switches in the multi-phase inverter are controlled to be open. For example, an open-circuit fault response can be applied at the inverter module by applying open-circuit fault response control signals to the PWM module that will cause an open-circuit fault response at the inverter module (i.e., cause all switches within the inverter module to be in an open state).

By contrast, during a short-circuit response, selected switches in the multi-phase inverter are controlled to connect all phases of the multi-phase inverter to a single bus (e.g., either the plus bus or the minus bus), and all other non-selected switches in the multi-phase inverter are controlled to be open such that the non-selected switches are not connected to the single bus (e.g., either the plus bus or the minus bus). For example, a short-circuit fault response can be applied at the inverter module by applying short-circuit fault response control signals to the PWM module that will cause a short-circuit fault response at the inverter module.

Whether an open or short-circuit fault response is applied at the inverter module can depend, for example, upon the machine's angular velocity (or "speed"). One approach for determining whether an open or short-circuit fault response is to be applied is disclosed in U.S. Pat. No. 7,279,862 B1 and U.S. Pat. No. RE 42,200, entitled "Fault Handling of Inverter Driven PM Motor Drives," their contents being incorporated by reference in their entirety herein.

When a fault condition occurs and the machine is operating at medium to high machine speeds (also known in the art as operating in a field-weakening region or range), a short-circuit fault response is usually applied to the inverter module, and it is desirable to apply the short-circuit fault response as fast or quickly as possible.

When a short-circuit fault response is applied, voltage commands transition from a high value to a low value, which can cause stator currents to oscillate, which in turn causes the torque generated by the machine to oscillate. This is undesirable.

It would be desirable to improve existing machine drive systems by increasing machine efficiency and increasing maximum power generated by the machine. It would also be desirable to improve current regulation robustness and the stator current transient response when the machine is operating in the field-weakening region either during normal operation or when a short-circuit fault response is applied in response to detecting a fault condition. It would also be desirable to improve the current transient response in the entire machine speed operation region while minimizing phase current overshoot. For example, when the electric machine is operating in field-weakening region and a short-circuit fault response is applied at the inverter module, it would be desirable to reduce or minimize phase current overshoot during the short-circuit fault response transition. Other desirable features and characteristics of the present invention will become apparent from the subsequent detailed description and the appended claims, taken in conjunction with the accompanying drawings and the foregoing technical field and background.

SUMMARY

Embodiments of the present disclosure relate to methods, systems and apparatus for controlling operation of an electric machine in a motor drive system.

In accordance with some of the disclosed embodiments, a method is provided for generating voltage command signals for controlling an electric machine. In accordance with the method, a current regulator module computes presently computed voltage command signals at a first time and provides them to a voltage command modification module. A timer is used to determine when voltage command signals are to be updated. A voltage command modification module outputs a plurality of different voltage command signals that comprise: presently computed voltage command signals when a transient stator voltage satisfies at least two conditions; modified voltage command signals when a timer value of a timer is determined to be less than or equal to a first timer value, wherein the modified voltage command signals are computed based on held versions of the presently computed voltage command signals and previously computed voltage command signals; and the held versions of the presently computed voltage command signals when the timer value of the timer is determined to be greater than or equal to the first timer value and is less than a second timer value.

DESCRIPTION OF THE DRAWINGS

Embodiments of the present disclosure will hereinafter be described in conjunction with the following drawing figures, wherein like numerals denote like elements.

FIG. 6A shows waveforms from FIG. 4A superimposed on those from FIG. 5A, FIG. 6B shows waveforms from FIG. 4B superimposed on those from FIG. 5B, and FIG. 6C shows waveforms from FIG. 4C superimposed on those FIG. 5C.

DESCRIPTION OF EXEMPLARY EMBODIMENTS

Figure 1:
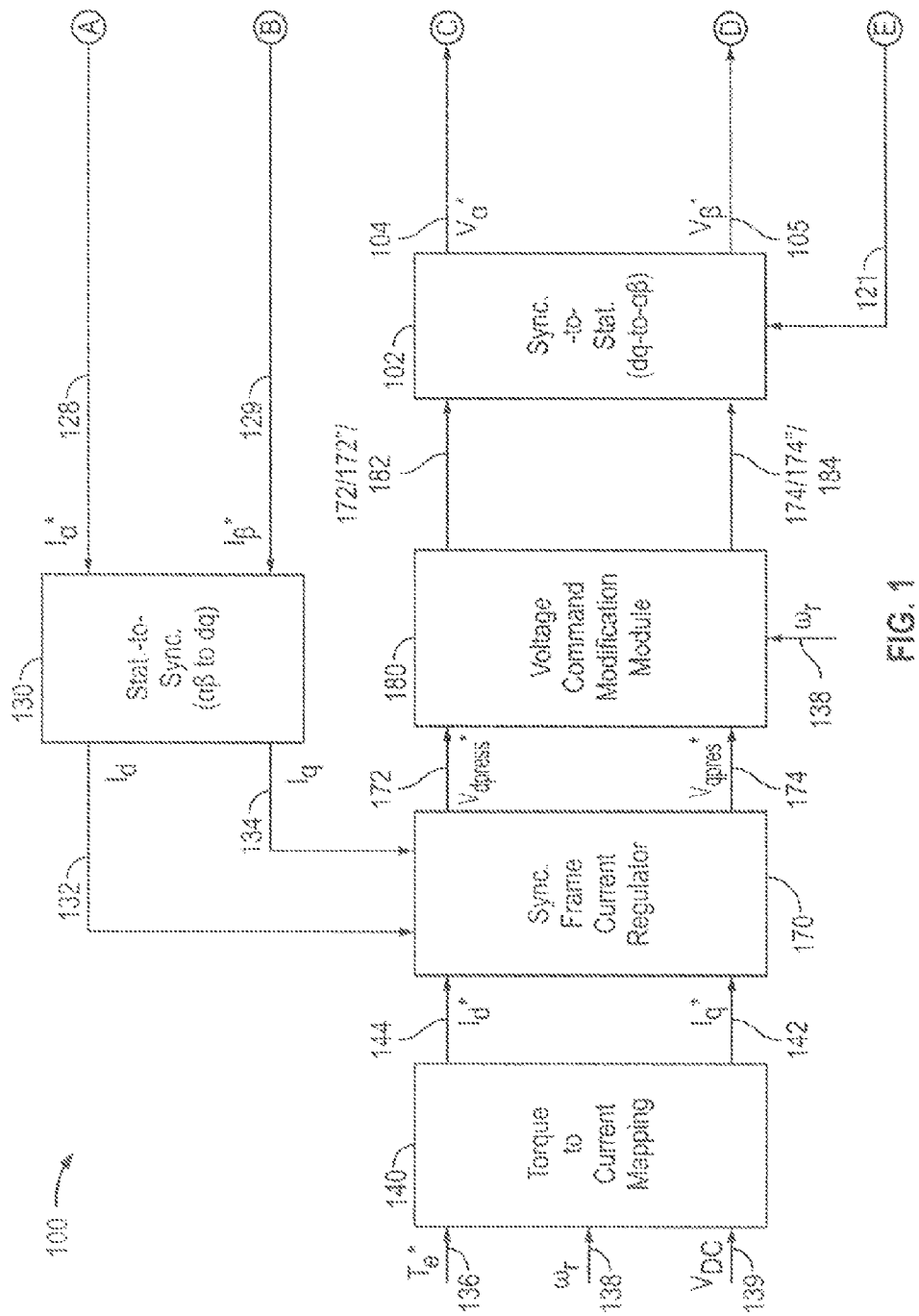
FIG. 1 is a block diagram of one example of a motor drive system in accordance with the disclosed embodiments.
Figure 1:
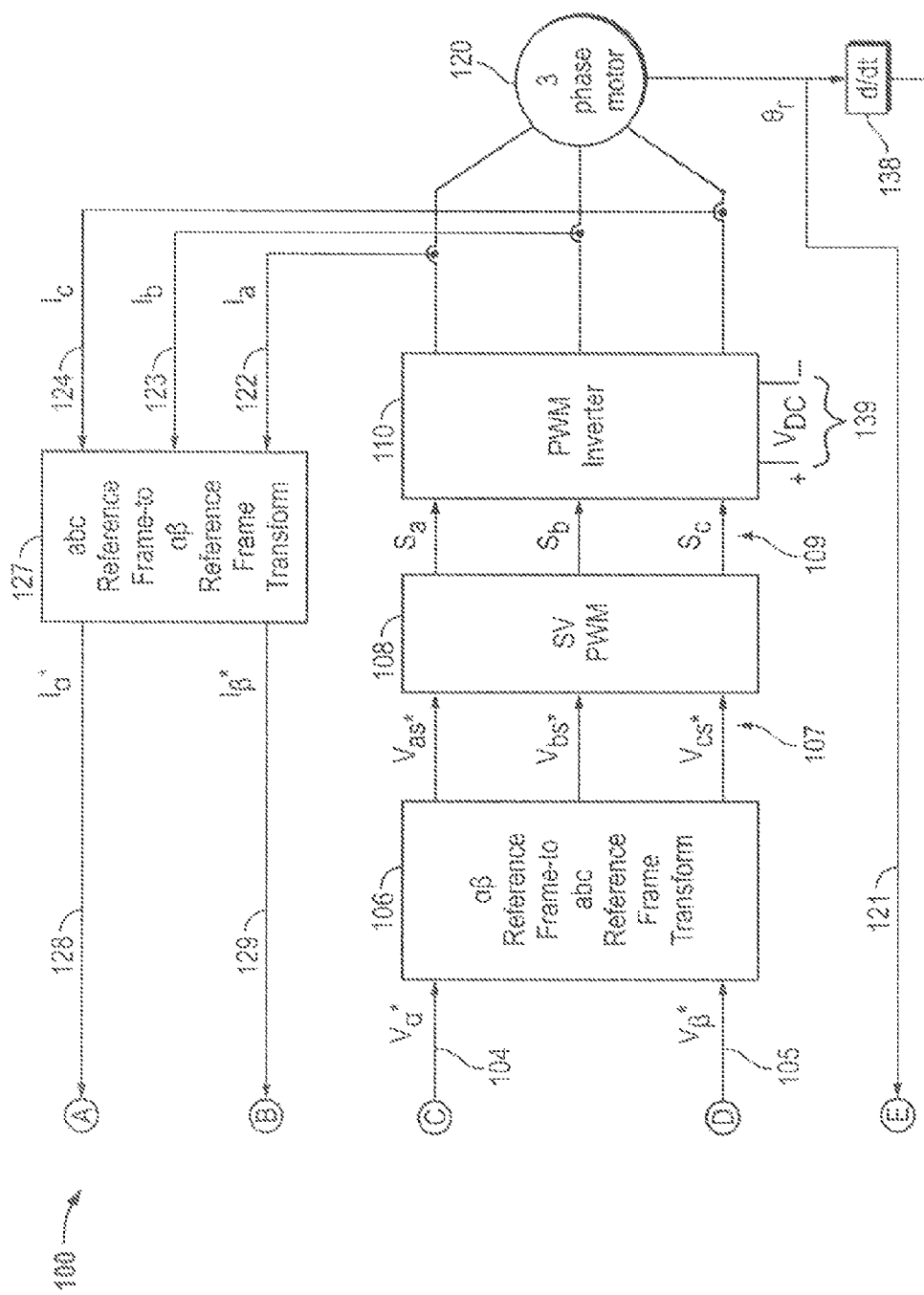

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to controlling operation of a multi-phase system. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for controlling operation of a multi-phase system, as described herein. As such, these functions may be interpreted as steps of a method for controlling operation of a multi-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

In one exemplary implementation, the multi-phase machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a multi-phase system having a multi-phase machine. As used herein, the term "multi-phase" refers to two or more phases, and can be used to refer to electric machines that have two or more phases. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current. In some implementations, an AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous.

FIG. 1 is a block diagram of one example of a motor drive system 100 in accordance with the disclosed embodiments. The system 100 controls a three-phase AC machine 120 via a three-phase pulse width modulated (PWM) inverter module 110 coupled to the three-phase AC machine 120 so that the three-phase AC machine 120 can efficiently use a DC input voltage (Vdc) 139 provided to the three-phase PWM inverter module 110 by adjusting current and voltage commands that control the three-phase AC machine 120. In one particular implementation, the vector controlled motor drive system 100 can be used to control torque in an HEV.

In the following description of one particular non-limiting implementation, the three-phase AC machine 120 is embodied as a three-phase AC powered motor 120, and in particular a three-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of multi-phase AC machine that includes fewer or more phases.

The three-phase AC motor 120 is coupled to the three-phase PWM inverter module 110 via three inverter poles and generates mechanical power (Torque×Speed) based on three-phase sinusoidal current signals 122 . . . 124 received from the PWM inverter module 110. In some implementations, the angular position 121 of a rotor (Or) of the three-phase AC motor 120 or "shaft position" is measured using a position sensor (not illustrated), and in other implementations, the angular position 121 of a rotor (Or) of the three-phase AC motor 120 can be estimated without using a position sensor by using sensorless position estimation techniques.

Figure 2A:
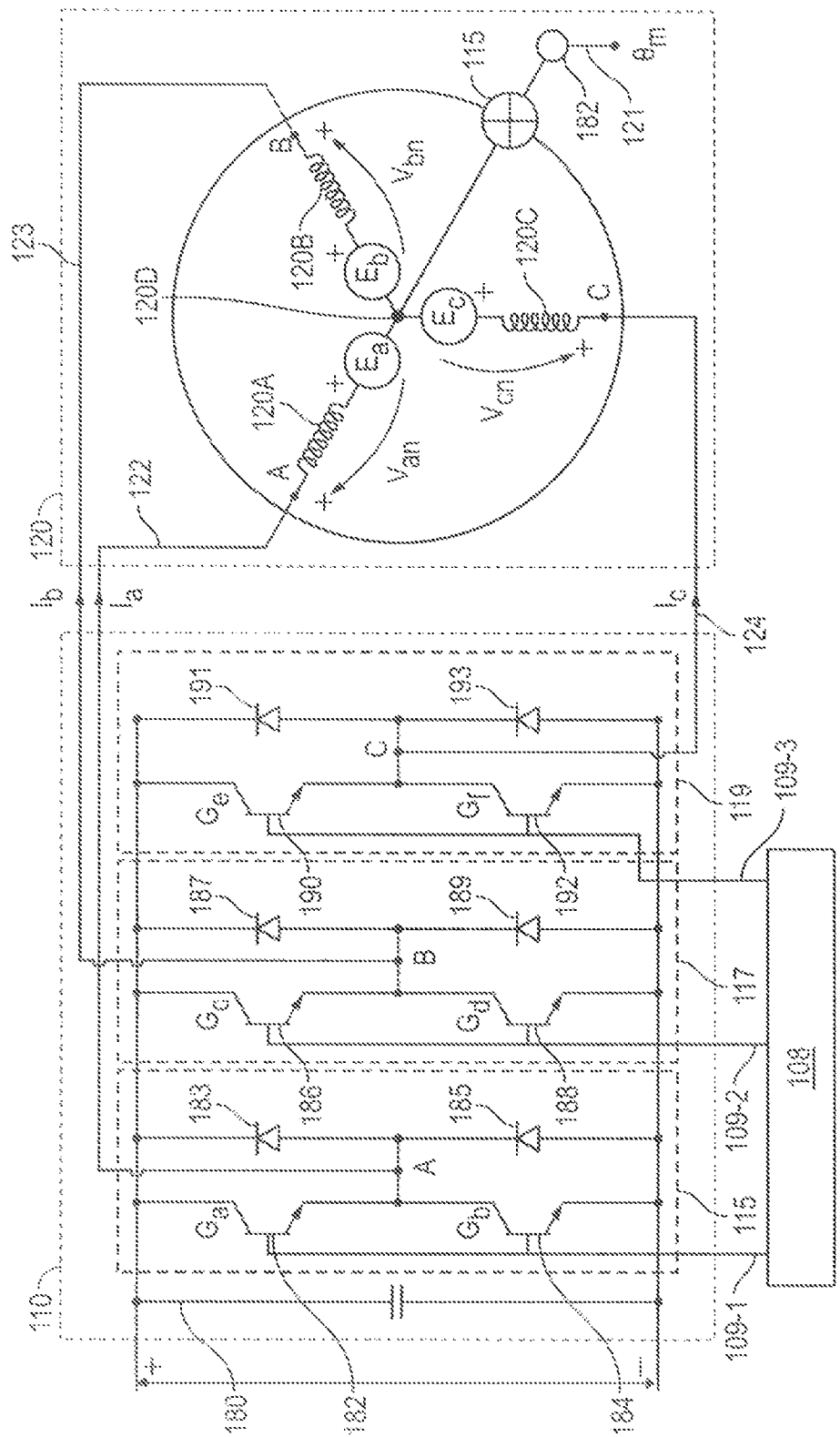
FIG. 2A is a block diagram of a portion of a motor drive system including a three-phase voltage source inverter connected to a three-phase AC motor.

Prior to describing operation details of the system 100, a more detailed description of one exemplary implementation of the three-phase voltage source inverter 110 will be provided with reference to FIG. 2A.

FIG. 2A is a block diagram of a portion of a motor drive system including a three-phase voltage source inverter 110 connected to a three-phase AC motor 120. It should be noted that the three-phase voltage source inverter 110 and the three-phase motor 120 in FIG. 1 are not limited to this implementation; rather, FIG. 2A is merely one example of how the three-phase voltage source inverter 110 and the three-phase motor 120 in FIG. 1 could be implemented in one particular embodiment.

As illustrated in FIG. 2A, the three-phase AC motor 120 has three stator or motor windings 120A, 120B, 120C, connected to motor terminals A, B, C, and the three-phase PWM inverter module 110 includes a capacitor 170 and three inverter sub-modules 115, 117, 119. In this particular embodiment, in phase A the inverter sub-module 117 is coupled to motor winding 120A, in phase B the inverter sub-module 116 is coupled to motor winding 120B, and in phase C the inverter sub-module 119 is coupled to motor winding 120C. The current into motor winding A 120A flows out motor windings B, C 120B-120C, the current into motor winding B 120B flows out motor windings A and C, 120A, 120C, and the current into motor winding C 120C flows out motor windings A and B, 120A, 120B.

The resultant phase or stator currents (Ia-Ic) 122, 123, 124, flow through respective stator windings 120A-C. The phase to neutral voltages across each of the stator windings 120A-120C are respectively designated as $V_{an}$, $V_{bn}$, $V_{cn}$, with the back electromotive force (EMF) voltages generated in each of the stator windings 120A-120C respectively shown as the voltages $E_a$, $E_b$, $E_c$, produced by ideal voltage sources, each respectively shown connected in series with stator windings 120A-120C. As is well known, these back EMF voltages $E_a$, $E_b$, $E_c$, are the voltages induced in the respective stator windings 120A-120C by the rotation of the permanent magnet rotor. Although not shown, the motor 120 can be coupled to a drive shaft.

The inverter 110 includes the capacitor 170, a first inverter sub-module 115 comprising a dual switch 182/183, 184/185, a second inverter sub-module 117 comprising a dual switch 186/187, 188/189, and a third inverter sub-module 119 comprising a dual switch 190/191, 192/193. As such, inverter 110 has six solid state controllable switching devices 182, 184, 186, 188, 190, 192, and six diodes 183, 185, 187, 189, 191, 193, to appropriately switch compound voltage ($V_{DC}$) and provide three-phase energization of the stator windings 120A, 120B, 120C of the three-phase AC motor 120.

A closed loop motor controller 108 can receive motor command signals and motor operating signals from the motor 120, and generate control signals 109 for controlling the switching of solid state switching devices 182, 184, 186, 188, 190, 192 within the inverter sub-modules 115, 117, 119. By providing appropriate control signals 109-1 . . . 109-3 to the individual inverter sub-modules 115, 117, 119, the closed loop motor controller 108 controls switching of solid state switching devices 182, 184, 186, 188, 190, 192, within the inverter sub-modules 115, 117, 119 and thereby controls the outputs of the inverter sub-modules 115, 117, 119 that are provided to motor windings 120A-120C, respectively. The resultant stator currents (Ia . . . Ic) 122-124 that are generated by the inverter sub-modules 115, 117, 119 of the three-phase inverter module 110 are provided to motor windings 120A, 120B, 120C. The voltages as $V_{an}$, $V_{bn}$, $V_{cn}$, and the voltage at node N (120D) fluctuate over time depending on the open/close states of switches 182, 184, 186, 188, 190, 192 in the inverter sub-modules 115, 117, 119 of the inverter module 110, as will be described below.

Referring again to FIG. 1, the vector control motor drive system 100 includes a torque-to-current mapping module 140, a synchronous (SYNC.) frame current regulator module 170, a voltage command modification module 180, a synchronous-to-stationary transformation module 102, an αβ reference frame-to-abc reference frame (αβ-to-abc) transformation module 106, a pulse width modulation (PWM) module 108, a three-phase PWM inverter 110, an abc reference frame-to-αβ reference frame (abc-to-αβ transformation module 127, and a stationary-to-synchronous (STAT.-TO-SYNC.) transformation module 130.

The torque-to-current mapping module 140 receives a torque command signal (Te*) 136, angular rotation speed (ωr) 138 of the shaft that is generated at block 137 based on the derivative of the rotor/shaft position output (Or) 121, and the DC input voltage ($V_{DC}$) 139 as inputs, along with possibly a variety of other system parameters depending upon implementation. The torque-to-current mapping module 140 uses these inputs to generate a d-axis current command (Id*) 142 and a q-axis current command (Iq*) 144 that will cause the motor 120 to generate the commanded torque (Te*) at speed (ωr) 138. In particular, the torque-to-current mapping module 140 uses the inputs to map the torque command signal (Te*) 136 to a d-axis current command signal (Id*) 142 and a q-axis current command signal (Iq*) 144. The synchronous reference frame d-axis and q-axis current command signals (Id*, Iq*) 142, 144 are DC commands that have a constant value as a function of time.

The abc-to-αβ transformation module 127 receives the measured three-phase stationary reference frame feedback stator currents (Ia . . . Ic) 122-124 that are fedback from motor 120. The abc-to-αβ transformation module 127 uses these three-phase stationary reference frame feedback stator currents 122-124 to perform an abc reference frame-to-αβ reference frame transformation to transform the three-phase stationary reference frame feedback stator currents 122-124 into stationary reference frame feedback stator currents (Iα, Iβ) 128, 129. The abc-to-αβ transformation is well-known in the art and for sake of brevity will not be described in detail.

The stationary-to-synchronous transformation module 130 receives the stationary reference frame feedback stator currents (Iα, Iβ) 128, 129 and the rotor angular position (Or) 121 and generates (e.g., processes or converts) these stationary reference frame feedback stator currents (Iα, Iβ) 128, 129 to generate a synchronous reference frame d-axis current signal (Id) 132 and a synchronous reference frame q-axis current signal (Iq) 134. The process of stationary-to-synchronous conversion is well-known in the art and for sake of brevity will not be described in detail.

The synchronous frame current regulator module 170 receives the synchronous reference frame d-axis current signal (Id) 132, the synchronous reference frame q-axis current signal (Iq) 134, the d-axis current command (Id*) 142 and the q-axis current command (Iq*) 144, and uses these signals to generate a synchronous reference frame d-axis voltage command signal (Vd*) 172 and a synchronous reference frame q-axis voltage command signal (Vq*) 174. The synchronous reference frame voltage command signals (Vd*, Vq*) 172, 174 are DC commands that have a constant value as a function of time for steady state operation. Because the current commands are DC signals in the synchronous reference frame they are easier to regulate in comparison to AC stationary reference frame current commands. The process of current to voltage conversion can be implemented as a Proportional-Integral (PI) controller, which is known in the art and for sake of brevity will not be described in detail.

The voltage command modification module 180 can compute and store a value of the transient stator voltage magnitude (Vspres*_tran) and a value of the transient stator voltage angle (Vangpres*_tran) that are computed based on transient stator voltage (Vspres*). The voltage command modification module 180 receives presently computed voltage command signals (Vdpres*, Vqpres*) 172, 174 along with the electrical angular frequency (ω) signal 138, and can output voltage command signals that can be either: (1) the presently computed voltage command signals (Vdpres*, Vqpres*) 172, 174, or (2) a held version of the presently computed voltage command signals (Vdpresheld*, Vqpresheld*) 172" during a transition period, 174" or (3) modified voltage command signals (Vd, Vq) 182, 184. The set of voltage command signals that is output depends on the transient value of the stator voltage magnitude (Vspres*_tran) and/or the stator voltage angle (Vangpres*_tran). If either the value of the transient stator voltage magnitude (Vspres*_tran) or the value of the transient stator voltage angle (Vangpres*_tran) is less than or equal to a corresponding threshold (Vs*_threshold, Vang*_threshold, respectively), then the voltage command modification module 180 outputs the presently computed voltage command signals (Vdpres*, Vqpres*) 172, 174. In contrast, if either the value of the transient stator voltage magnitude (Vspres*_tran) or the value of the transient stator voltage angle (Vangpres*_tran) is greater than its corresponding thresholds Vs_threshold or Vang_threshold respectively, the set of voltage command signals (i.e., the held version of the presently computed voltage command signals (Vdpresheld*, Vqpresheld*) 172", 174" or the modified voltage command signals (Vd, Vq) 182, 184) that is output depends on the timer value of a timer that is used to determine when voltage command signals are to be updated. The values for transient stator voltage magnitude (Vs*_tran), and transient stator voltage angle (Vang*_tran) can be computed using based on equations (1) and (2) below.

$$V_{s\_tran}^* = |V_{spres}^* - V_{sprev}^*|, \quad (1)$$

$$V_{ang\_tran}^* = |V_{angpres}^* - V_{angprev}^*|, \quad (2)$$

$$V_s^* = \sqrt{V_d^{*2} + V_q^{*2}}, \quad (3)$$

$$V_{ang}^* = \arctan\left(\frac{-V_d^*}{V_q^*}\right), \quad (4)$$

A transient value for each can be computed.

Equations (1) and (2) show the absolute difference between the presently computed value of the transient stator voltage magnitude (Vspres*_tran) and the previously computed value of the transient stator voltage magnitude (Vsprev*_tran), and the absolute difference between the presently computed value of the stator voltage angle (Vangpres*_tran) and the previously computed value of the stator voltage angle (Vangprev*_tran). Equations (3) and (4) show how the voltage magnitude and voltage angle can be calculated.

The voltage command signals output by the voltage command modification module 180 have a first value when (1) the presently computed voltage command signals (Vdpres*, Vqpres*) 172, 174 are selected by the voltage command modification module 180, or a second value when the (2) modified voltage command signals (Vd, Vq) 182, 184 are selected by the voltage command modification module 180 (e.g., during a transition period), or a third value when (3) the held version of the presently computed voltage command signals (Vdpresheld*, Vqpresheld*) 172", 174" are selected by the voltage command modification module 180. As will be explained in greater detail below, if neither Vs_tran* nor Vang_tran* is higher than their corresponding thresholds, the presently computed voltage command signals (Vdpres*, Vqpres*) 172, 174 are selected and ouput by the voltage command modification module 180. In contrast, if either Vs_tran* or Vang_tran* is higher than their corresponding thresholds, the modified voltage command signals (Vd, Vq) 182, 184 are selected by the voltage command modification module 180 and output for the first half of the period, and then the held version of the presently computed voltage command signals (Vdpresheld*, Vqpresheld*) 172", 174" are selected and output by the voltage command modification module 180 for the second half of the period.

In one embodiment, the voltage command modification module 180 receives the presently computed synchronous reference frame d-axis voltage command signal (Vdpres*) 172 and the presently computed synchronous reference frame q-axis voltage command signal (Vqpres*) 174, and processes these voltage command signals 172, 174 to generate a modified synchronous reference frame d-axis voltage command signal (Vd) 182 and a modified synchronous reference frame q-axis voltage command signal (Vq) 184. In one implementation, the modified voltage command signals (Vd, Vq) 182, 184 are computed based on an average of the held version of the presently computed voltage command signals (Vdpresheld*, Vqpresheld*) 172", 174" and previously computed voltage command signals (Vdprev*, Vqprev*) 172', 174' that are stored. In other words, Vdprev* is equal to the previous loop sample Vdpres[k−1], and Vqprev* is equal to the previous loop sample Vqpres*[k−1], where k is a sample index of the current sample and k−1 is a sample index of a previous sample.

In one embodiment, the voltage command modification module 180 can generate a first selection signal when a timer value of the timer is determined to be less than or equal to a first timer value, and can generate a second selection signal when the timer value of the timer is determined to be greater than to a first timer value and to be less than or equal to a second timer value. At least one transition period that takes place between the first selection signal and the second selection signal. The voltage command modification module 180 can select and output the modified voltage command signals (Vd, Vq) 182, 184 in response to the first selection signal (which is generated based on the value of the timer) or the held version of the presently computed voltage command signals (Vdpresheld*, Vqpresheld*) 172", 174" in response to second selection signal (which is also generated based on the value of the timer).

Further detail regarding operation of and processing performed by the voltage command modification module 180 will be described later below with reference to FIGS. 2B and 3.

The synchronous-to-stationary transformation module 102 receives either the (1) the presently computed voltage command signals (Vdpres*, Vqpres*) 172, 174, or (2) modified voltage command signals (Vd, Vq) 182, 184 (e.g., during a transition period), or (3) the held version of the presently computed voltage command signals (Vdpresheld*, Vqpresheld*) 172", 174", as inputs along with the rotor position output (θr) 121, and can use these inputs to perform a dq-to-αβ transformation to generate an α-axis stationary reference frame voltage command signal (Vα*) 104 and a β-axis stationary reference frame voltage command signal (Vβ*) 105. The stationary reference frame α-axis and β-axis voltage command signals (Vα*, Vβ*) 104, 105 are in the stationary reference frame and therefore have values that vary as a sine wave as a function of time. The process of synchronous-to-stationary conversion is well-known in the art and for sake of brevity will not be described in detail.

Referring still to FIG. 1, the αβ-to-abc transformation module 106 receives the stationary reference frame voltage command signals (Vα*, Vβ*) 104, 105, and based on these signals, generates stationary reference frame voltage command signals (Vas* ... Vcs*) 107 (also referred to as "phase voltage command signals") that are sent to the PWM module 108. The αβ-to-abc transformation is well-known in the art and for sake of brevity will not be described in detail.

The three-phase PWM inverter module 110 is coupled to the PWM module 108. The PWM module 108 is used for the control of pulse width modulation (PWM) of the phase voltage command signals (Vas* ... Vcs*) 107. The switching vector signals (Sa ... Sc) 109 are generated based on duty cycle waveforms that are not illustrated in FIG. 1, but are instead internally generated at the PWM module 108 to have a particular duty cycle during each PWM period. The PWM module 108 modifies the phase voltage command signals (Vas* ... Vcs*) 107 based on the duty cycle waveforms (not illustrated in FIG. 1) to generate switching vector signals (Sa ... Sc) 109, which it provides to the three-phase PWM inverter module 110. The particular modulation algorithm implemented in the PWM module 108 can be any known modulation algorithm including Space Vector Pulse Width Modulation (SVPWM) techniques to control of pulse width modulation (PWM) to create alternating current (AC) waveforms that drive the three-phase AC powered machine 120 at varying speeds based on the DC input 139.

The switching vector signals (Sa ... Sc) 109 control the switching states of switches in PWM inverter 110 to generate three-phase voltage commands at each phase A, B, C. The switching vector signals (Sa ... Sc) 109 are PWM waveforms that have a particular duty cycle during each PWM period that is determined by the duty cycle waveforms that are internally generated at the PWM module 108. The three-phase voltage source inverter module 110 must be controlled so that at no time are both switches in the same inverter sub-module 115, 117, 119 (FIG. 2A) or "leg" are turned on to prevent the DC supply from being shorted. As such, the switches in the same inverter sub-module 115, 117, 119 (FIG. 2A) are operated such that when one is off the other is on and vice versa. To explain further, in a given phase (A ... C) at any particular time, one of the switches is off and the other one of the switches is on (i.e., the two switches in a particular inverter sub-module must have opposite on/off states). As one example with respect to phase A, when switch 182 is on, switch 184 is off, and vice-versa. As such, for a particular inverter sub-module, the on/off status of the two switches in that inverter sub-module can be represented as a binary 1 or binary 0. For example, when the upper switch in a given phase is on (and the lower switch is off) the value of a bit will be one (1), and when the lower switch in a given phase is on (and the upper switch is off) the value of a bit will be zero (0).

The three-phase PWM inverter module 110 receives the DC input voltage (Vdc) and switching vector signals (Sa ... Sc) 109, and uses them to generate three-phase alternating current (AC) voltage signal waveforms at inverter poles that drive the three-phase AC machine 120 at varying speeds (ωr) 138.

The three-phase machine 120 receives the three-phase voltage signals generated by the PWM inverter 110 and generates a motor output at the commanded torque Te* 136. In one particular implementation, the machine 120 comprises a three-phase interior permanent-magnet synchronous motor (IPMSM) 120, but the disclosed embodiments can be any multi-phase AC machine having any number of phases.

Although not illustrated in FIG. 1, the system 100 may also include a gear coupled to and driven by a shaft of the three-phase AC machine 120. The measured feedback stator currents (Ia-Ic) 122-124 are sensed, sampled and provided to the abc-to-αβ transformation module 127 as described above.

Natural Frequency and Damping Factor

The natural frequency and the damping factor of a PM machine are a function of stator resistance, d-axis stator inductance, q-axis stator inductance, and electrical frequency (speed) of the machine. For example, in some machines, above 50 rpm, the natural frequency is very close to the electrical frequency, and the machine is under-damped. This means that any voltage transient will excite its natural frequency and it tends to oscillate. As will be described below, the proposed algorithm can help to reduce and/or avoid such oscillation.

An embodiment of the voltage command modification module 180 will now be described with reference to FIG. 2B.

Figure 2B:
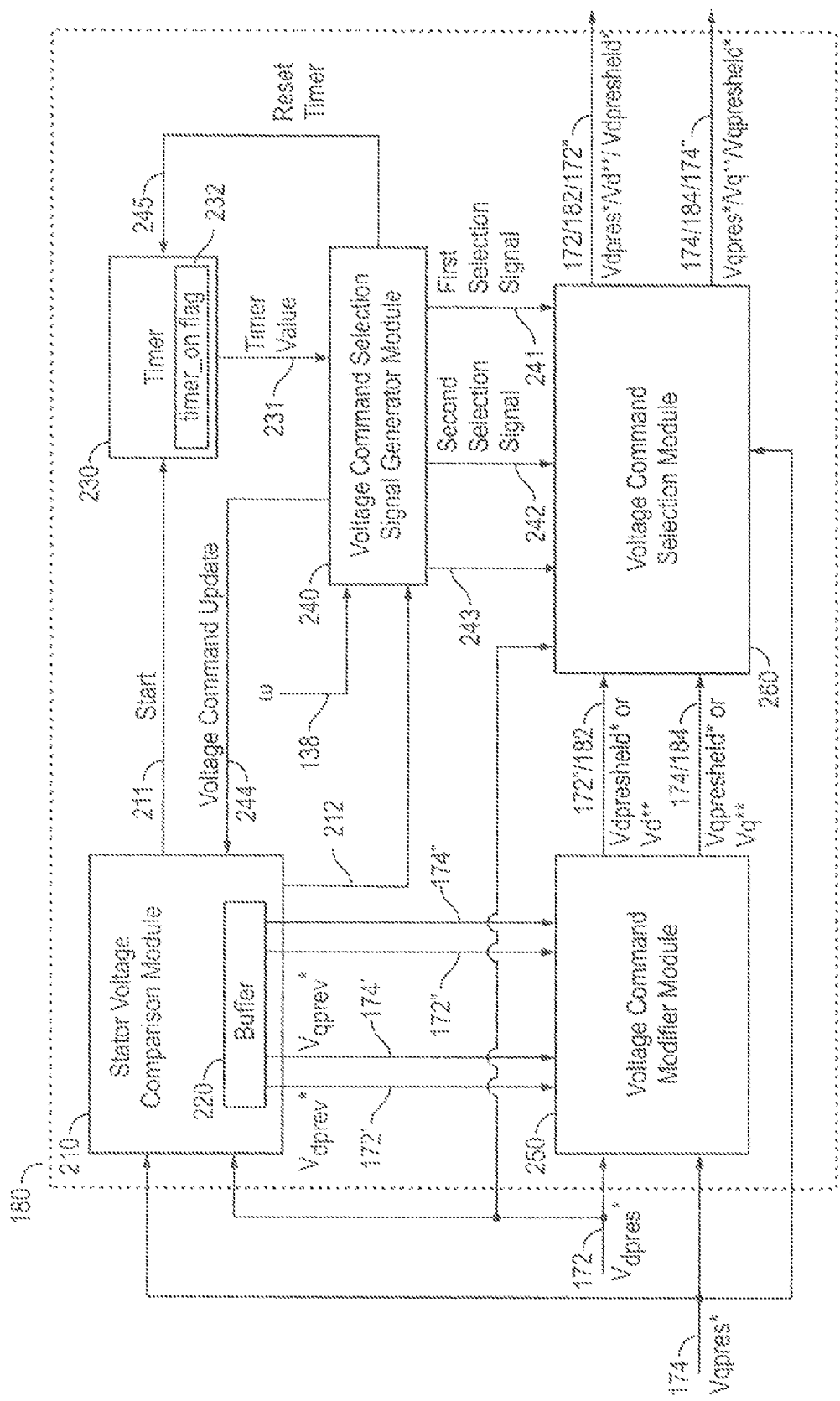
FIG. 2B is a block diagram of a voltage command modification module for generating synchronous reference frame voltage command signals for controlling an electric machine in accordance with one implementation of the disclosed embodiments.

FIG. 2B is a block diagram of a voltage command modification module 180 for generating synchronous reference frame voltage command signals 182, 184 or 172, 174 for controlling an electric machine in accordance with one implementation of the disclosed embodiments. As will be explained below, the voltage command modification module 180 can reduce stator current and torque oscillation, which can in turn improve machine efficiency and performance, as well as utilization of the DC voltage source. In addition, it allows the fastest smooth torque transition in the machine.

Although not illustrated, the voltage command modification module 180 is coupled to the current regulator module 170 of FIG. 1. As explained above, the current regulator module 170 generates the synchronous reference frame d-axis synchronous reference frame voltage command signal (Vd*) 172 and the synchronous reference frame q-axis synchronous reference frame voltage command signal (Vq*) 174. In the description that follows different versions of each of these signals can be used that will be referred to as "presently computed" voltage command signals (Vdpres*, Vqpres*) 172, 174 (that are generated or computed by the current regulator module 170 at a first time or present sample (k), "previously computed" voltage command signals (Vdprev*, Vqprev*) 172', 174' (that are generated or computed by the current regulator module 170 at a second time or previous sample (k−1) occurring prior to the first time or present sample (k) and stored at buffer 220 as will be described below), a held version of the presently computed voltage command signals (Vdpresheld*, Vqpresheld*) 172", 174" that are held or stored at a buffer 220. For example, in one embodiment, the previously computed voltage command signals (Vdprev*, Vqprev*) 172', 174' were generated or computed by the current regulator module 170 during a loop sample occurring immediately prior to the current loop sample during which the current regulator module 170 generated or computed presently computed voltage command signals (Vdpres*, Vqpres*) 172, 174. In other words, Vdprev* is equal to the previous loop sample Vdpres*[k−1], and Vqprev* is equal to the previous loop sample Vqpres*[k−1].

In one non-limiting embodiment, the voltage command modification module 180 includes a stator voltage comparison module 210 at which a buffer 220 can be implemented, a timer 230 that is used to determine when voltage command signals are to be updated, a voltage command selection signal generator module 240, a voltage command modifier module 250 and a voltage command selection module 260.

The stator voltage comparison module 210 generates a start signal 211 to start the timer 230; in other words, the timer 230 is started in response to the start signal. In one embodiment, the stator voltage comparison module 210 computes a magnitude of the present stator voltage command (Vspres*_tran) based on the presently computed voltage command signals (Vdpres*, Vqpres*) 172, 174 and a magnitude of the previous stator voltage command (Vsprev*_tran) based on the previously computed voltage command signals (Vdprev*, Vqprev*) 172', 174', and computes a voltage angle of a present stator voltage command (Vspres*_tran) based on presently computed voltage command signals (Vdpres*, Vqpres*) 172, 174 and a voltage angle of a previous stator voltage command (Vsprev*_tran) based on previously computed voltage command signals (Vdprev*, Vqprev*) 172', 174'. Based on these values, the stator voltage comparison module 210 can determine whether an absolute difference between the magnitude of the present stator voltage command (Vspres*_tran) and the magnitude of the previous stator voltage command (Vsprev*_tran) greater than a threshold, or whether an absolute difference between the angle of the present stator voltage command (Vangpres*_tran) and the angle of the previous stator voltage command (Vangprev*_tran) greater than another threshold. When the absolute difference between the magnitude of the present stator voltage command (Vspres*_tran) and the magnitude of the previous stator voltage command (Vsprev*_tran) is greater than the threshold and/or when the absolute difference between the angle of the present stator voltage command (Vangpres*_tran) and the angle of the previous stator voltage command (Vangprev*_tran) greater than the other threshold, the stator voltage comparison module 210 generates the start signal (to start the timer 230), which sets a timer-on flag 232, and the voltage command selection signal generator module 240 generates a hold voltage command update input 244 to hold the voltage command update. When the hold voltage command update input 244 is enabled, Vdpreheld* and Vqpreheld* are updated. When the hold voltage command update input 244 is not enabled, Vdpreheld* and Vqpreheld* are not updated.

By contrast, when the absolute difference between the magnitude of the present stator voltage command (Vspres*_tran) and the magnitude of the previous stator voltage command (Vsprev*_tran) is not greater than the threshold, or when the absolute difference between the angle of the present stator voltage command (Vangpres*_tran) and the angle of the previous stator voltage command (Vangprev*_tran) is not greater than the other threshold, the stator voltage comparison module 210 generates a command signal 212 that is provided to the voltage command selection signal generator module 240. As will be described below, the command signal 212 causes the voltage command selection signal generator module 240 to output a select present selection signal 243, which in turn causes the voltage command selection module 260 to select and output the presently computed voltage command signals (Vdpres*, Vqpres*) 172, 174.

The voltage command selection signal generator module 240 can output the held version of the presently computed voltage command signals (Vdpresheld*, Vqpresheld*) 172", 174" and the modified voltage command signals (Vd, Vq) 182, 184, and the voltage command selection module 260 will select and output one of these depending on a timer value 231 of the timer 230. The voltage command selection signal generator module 240 determines whether the timer value 231 of the timer 230 is less than or equal to a first timer value, which in one embodiment, can be one-half of the inverse of an electrical angular frequency (ω) signal 138. When the timer value 231 of the timer 230 is determined to be less than or equal to the first timer value, the voltage command selection signal generator module 240 generates a select modified selection signal 241. When the voltage command selection signal generator module 240 determines that the timer value 231 of the timer 230 is not less than or equal to the first timer value, it can determine whether the timer value 231 of the timer 230 is less than or equal to a second timer value that is, for example, the inverse of the electrical angular frequency (ω) signal. When the timer value 231 of the timer 230 is determined to be less than or equal to the second timer value, the voltage command selection signal generator module 240 can generate a select held present selection signal 242. When the voltage command selection signal generator module 240 determines that the timer value 231 of the timer 230 is not less than or equal to the second timer value, the voltage command selection signal generator module 240 generates a reset signal 245 that resets the timer 230, and clears the timer-on flag 232. In addition, the hold voltage command update 244 is enabled when the voltage command selection signal generator module 240 determines that the timer value 231 of the timer 230 is not less than or equal to the second timer value. When the hold voltage command update 244 is enabled, Vdpresheld* and Vqpresheld* are allowed to be updated with values coming from the current regulator Vdpres* and Vqpres* (e.g., Vdpresheld*=Vdpres*, and Vqpresheld*=Vqpres*).

In one embodiment, the voltage command modifier module 250 computes modified voltage command signals (Vd, Vq) 182, 184 based on the held version of the presently computed voltage command signals (Vdpresheld*, Vqpresheld*) 172", 174" and the previously computed voltage command signals (Vdprev*, Vqprev*) 172', 174'. In one embodiment, the voltage command modifier module 250 computes the modified (synchronous reference frame) voltage command signals (Vd, Vq) 182, 184 based on an average of the held version of the presently computed voltage command signals (Vdpresheld*, Vqpresheld*) 172", 174" and previously computed voltage command signals (Vdprev*, Vqprev*) 172', 174'.

The voltage command selection module 260 can select and output either: (1) the presently computed voltage command signals (Vdpres*, Vqpres*) 172, 174 in response to the select present selection signal 243 selection signal, or (2) modified voltage command signals (Vd, Vq) 182, 184 in response to the first selection signal 241 (e.g., during a transition period), or the (3) the held version of the presently computed voltage command signals (Vdpresheld*, Vqpresheld*) 172", 174" in response to second selection signal 242.

Figure 3:
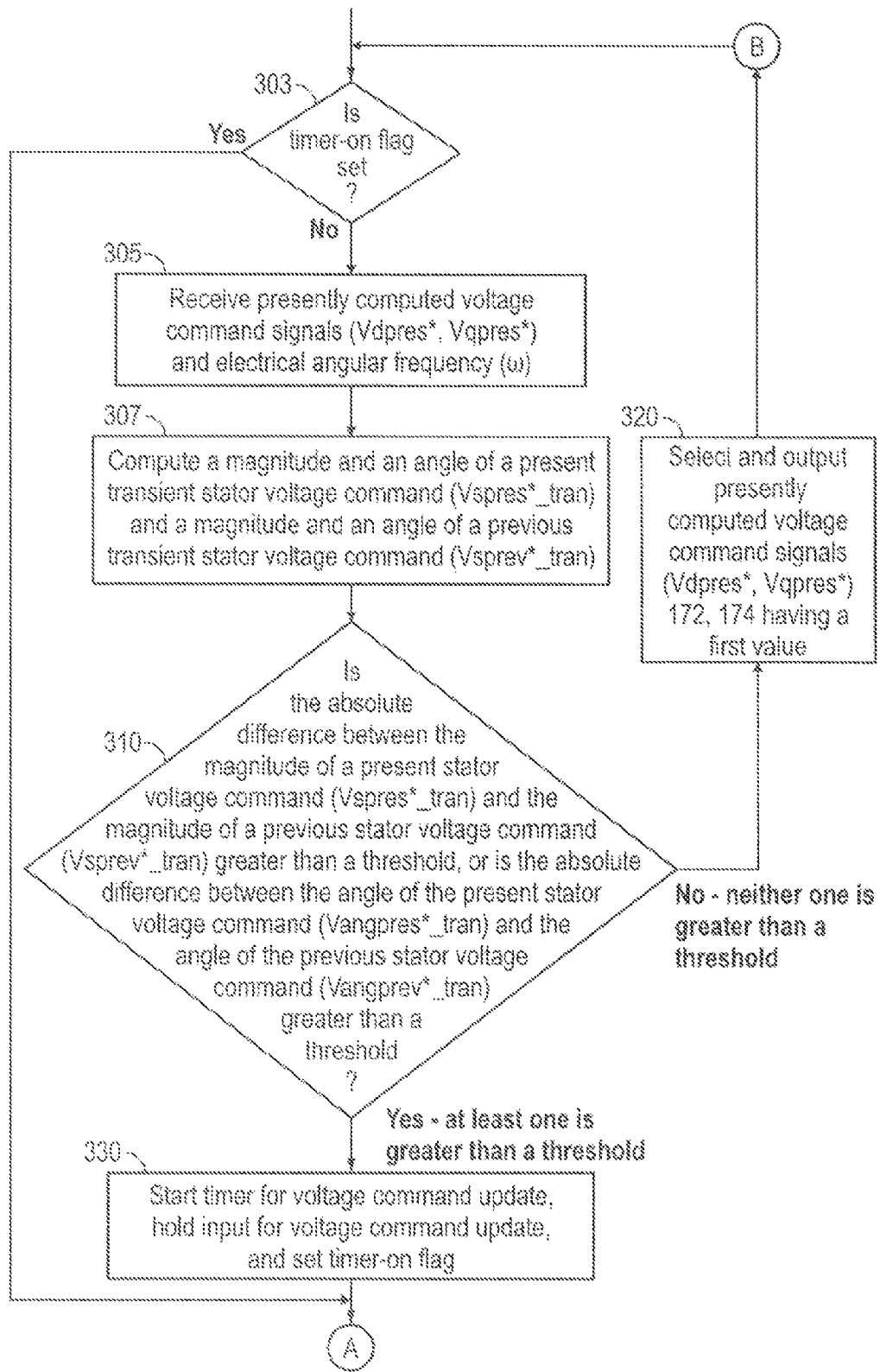
FIG. 3 is a flow chart that illustrates a method for generating voltage command signals for controlling an electric machine in accordance with the disclosed embodiments.
Figure 3:
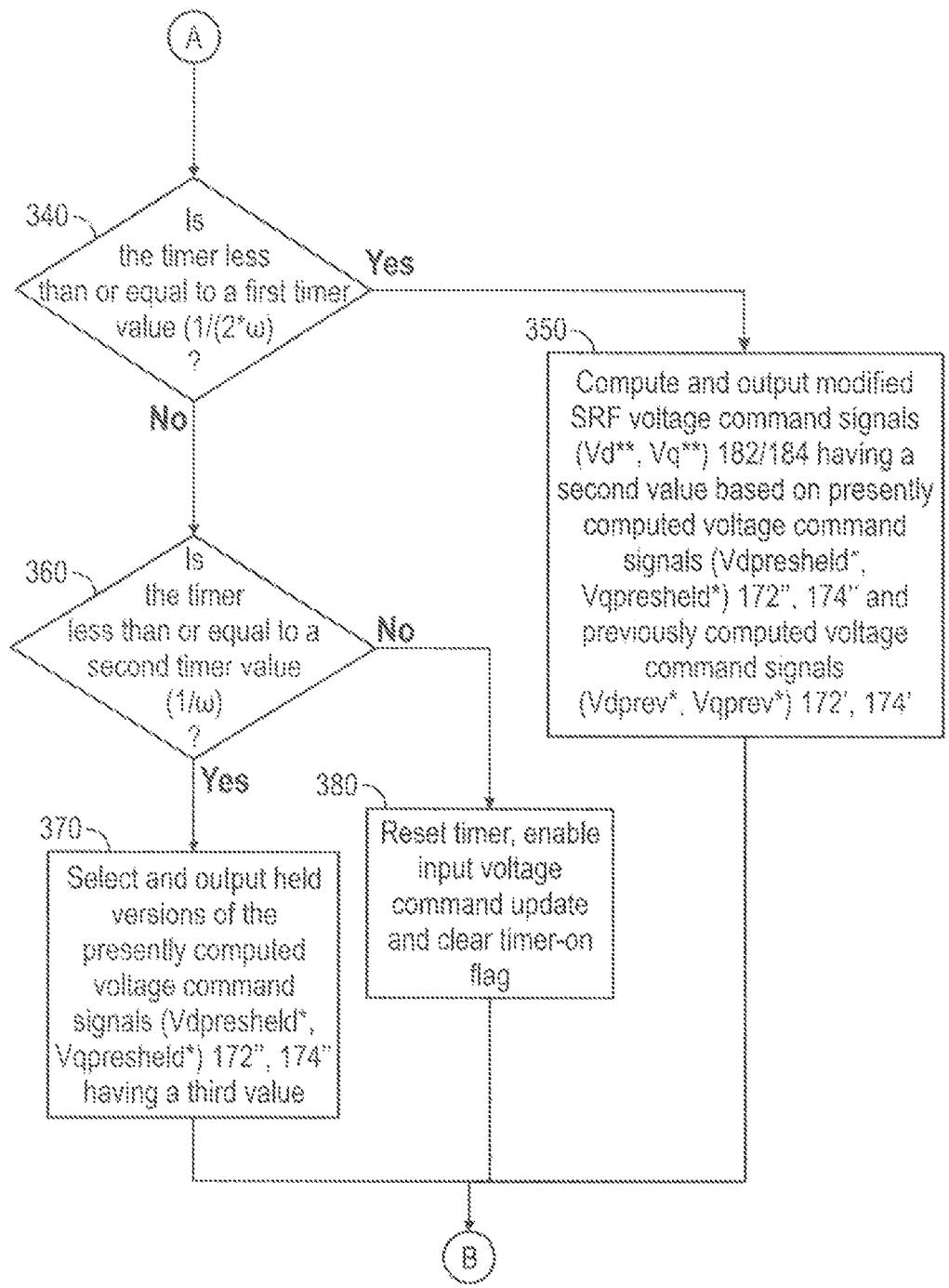

FIG. 3 is a flow chart that illustrates a method 300 for generating voltage command signals for controlling an electric machine in accordance with the disclosed embodiments. Method 300 will be described below with reference to FIGS. 1, 2A, and 2B.

Method 300 begins at step 303, where the voltage command modification module 180 determines if a timer-on flag is set. When the voltage command modification module 180 determines that the timer-on flag is set, the method 300 proceeds to step 340 as will be described below. When the voltage command modification module 180 determines that the timer-on flag is not set, the method 300 proceeds to step 305.

At step 305 when the voltage command modification module 180 receives presently computed voltage command signals (Vdpres*, Vqpres*) from the synchronous reference frame current regulator module 170, and an electrical angular frequency (ω) signal. Here, presently computed voltage command signals (Vdpres*, Vqpres*) refer to synchronous reference frame voltage command signals that are computed during the present or current loop sample (k). In one embodiment, at 305, the voltage command modification module 180 also computes a first value as one-half of the inverse of the electrical angular frequency (ω) signal, and a second value as the inverse of the electrical angular frequency (ω) signal.

At step 307, the voltage command modification module 180 computes a presently computed value of the transient stator voltage magnitude (Vspres*_tran) and a presently computed value of the stator voltage angle (Vangpres*_tran) based on the presently computed voltage command signals (Vdpres*, Vqpres*), and a previously computed value of the transient stator voltage magnitude (Vsprev*_tran), and a previously computed value of the stator voltage angle (Vangprev*_tran) based on previously computed voltage command signals (Vdprev*, Vqprev*). In one embodiment, at 307, the voltage command modification module 180 computes the magnitude of and the angle of the transient stator voltage (Vspres*_tran, Vangpres*_tran) and the magnitude of and the angle of the previous transient stator voltage command (Vsprev*_tran, Vangprev*_tran) via equations (5)-(9) as follows:

$$V^*_{spres\_tran} = \sqrt{V^{*2}_{dpres} + V^{*2}_{qpres}}, \quad (5)$$

$$V^*_{sprev\_tran} = \sqrt{V^{*2}_{dprev} + V^{*2}_{qprev}}, \quad (6)$$

$$V^*_{angpres\_tran} = \arctan\left(\frac{-V^*_{dpres}}{V^*_{qpres}}\right), \quad (7)$$

$$V^*_{angprev\_tran} = \arctan\left(\frac{-V^*_{dprev}}{V^*_{qprev}}\right), \quad (8)$$

where Vdpres* and Vqpres* are the presently computed d-axis voltage command signal 172 and the presently computed q-axis voltage command signal 174 that are currently output by current controller 170, and where Vdprev* and Vqprev* are the previously computed d-axis voltage command signal 172 and the previously computed q-axis voltage command signal 174 that were previously output by current controller 170. Here, "previously computed" voltage command signals refer to voltage command signals that were computed during a previous loop sample (k−1) immediately prior to present or current PWM period (k) that the "presently computed" voltage command signals (Vdpres*, Vqpres*) 172, 174 were computed during.

At 310, the voltage command modification module 180 determines if the absolute difference between the present value of the transient stator voltage magnitude (Vspres*_tran) and the previous value of the transient stator voltage magnitude (Vsprev*_tran) greater than a threshold (e.g., voltage magnitude changes +/−30%), and/or if the absolute difference between the present value of the transient stator voltage angle (Vangpres*_tran) and the previous value of the transient stator voltage angle (Vangprev*_tran) is greater than another threshold (e.g., voltage angle changes +/−5 degrees).

When the absolute difference between the present value of the transient stator voltage magnitude (Vspres*_tran) and the previous value of the transient stator voltage magnitude (Vsprev*_tran) is not greater than the threshold, and when the absolute difference between the present value of the transient stator voltage angle (Vangpres*_tran) and the previous value of the transient stator voltage angle (Vangprev*_tran) is not greater than the other threshold, the method 300 proceeds to 320, where the voltage command modification module 180 outputs the presently computed voltage command signals (Vdpres*, Vqpres*) 172, 174 without modification. In other words, at step 320 the voltage command modification module 180 allows Vdpres* and Vqpres* (from current regulator 170) to pass through back to voltage command modification module 180.

When the absolute difference between the present value of the transient stator voltage magnitude (Vspres*_tran) and the previous value of the transient stator voltage magnitude (Vsprev*_tran) is greater than the threshold, and/or, when the absolute difference between the present value of the transient stator voltage angle (Vangpres*_tran) and the previous value of the transient stator voltage angle (Vangprev*_tran) is greater than the other threshold, the method 300 proceeds to 330, where the voltage command modification module 180 starts a timer 230 for updating the voltage command signal, sets timer-on flag, and holds an input for voltage command updates. The values Vdpres* 172 and Vqpres* 174 from the current regulator 170 are stored or "held." However, in the following loop samples, Vdpresheld* and Vqpresheld* will not be updated. Updating of Vdpresheld* and Vqpresheld* will resume when the voltage command update signal 244 is enabled (e.g., Vdpresheld* and Vqpresheld* will not be updated with Vdpres* and Vqpres* for the following loop samples as long as timer-on flag is set).

As will be explained below, the timer 230 is used to determine when voltage command signals are to be updated by comparing the timer value 231 at the timer to timer values (e.g., $(1/(2*\omega))$ and $1/(\omega)$, where $\omega$ is the electrical angular frequency ($\omega$) signal). In one exemplary implementation, the voltage command modification module 180 changes the voltage commands in two (i.e., at least two or more) equally-spaced steps (e.g., in time and voltage transient) to avoid excitation of an electrical resonance frequency. The initial voltage step excites the under-damped machine, and the second voltage step excites the system 180° phase-shifted as opposed to the initial step. In other words, the second step counters the first excitation and helps to reduce/minimize current and torque ripple.

At 340, the voltage command modification module 180 determines whether the timer less than or equal to a first timer value, which is $1/(2*\omega)$ in one embodiment.

When the voltage command modification module 180 determines that the timer value 231 of the timer 230 is less than or equal to the first timer value, the method 300 proceeds to 350, where the voltage command modification module 180 computes and outputs modified voltage command signals (Vd, Vq) that are computed based on the held version of the presently computed voltage command signals (Vdpresheld*, Vqpresheld*) and the previously computed voltage command signals (Vdprev*, Vqprev*).

For example, in one embodiment, the voltage command modification module 180 computes a modified synchronous reference frame d-axis voltage command signal (Vd**) based on the held version of the presently held d-axis voltage command signal (Vdpresheld*), and previously computed d-axis voltage command signal (Vdprev*) via equation (9) as follows:

$$V_d^{**} = \frac{V_{dpresheld}^* + V_{dprev}^*}{2} \quad (9)$$

Similarly, the voltage command modification module 180 can compute a modified synchronous reference frame q-axis voltage command signal (Vq**) based on the held version of the presently held q-axis voltage command signal (Vqpresheld*) and the previously computed q-axis voltage command signal (Vqprev*) via equation (10) as follows:

$$V_q^{**} = \frac{V_{qpresheld}^* + V_{qprev}^*}{2} \quad (10)$$

When the voltage command modification module 180 determines that the timer value 231 of the timer 230 is not less than or equal to the first timer value $1/(2*\omega)$, the method 300 proceeds to step 360, where the voltage command modification module 180 determines whether the timer value 231 of the timer 230 is less than or equal to a second timer value that is equal to $(1/\omega)$ in one embodiment.

When the voltage command modification module 180 determines that the timer value 231 of the timer 230 is less than or equal to the second timer value, the method 300 proceeds to step 370, where the voltage command modification module 180 selects and outputs the held version of the presently computed voltage command signals (Vdpresheld*, Vqpresheld*) 172", 174", and the method 300 loops back to 303. In other words, at step 370, Vdpresheld* and Vqpresheld* that were held in step 330 are output from the voltage command modification module 180 as the held version of the presently computed voltage command signals (Vdpresheld*, Vqpresheld*) 172", 174". It is noted that at the time that the algorithm branches to 370, Vdpresheld* and Vqpresheld* might not be equal to Vdpres* and Vqpres* that were output from the current regulator 170, the reason is that the second timer value $(1/\omega)$ is likely to be larger than the value of loop sample period of the current regulator.

When the voltage command modification module 180 determines that the timer value 231 of the timer 230 is not less than or equal to the second timer value $1/(\omega)$, the method 300 proceeds to step 380, where the voltage command modification module 180 resets the timer, clears the timer-on flag, and enables an input 244 for voltage command updates, and the method 300 loops back to step 303. As explained above, when the input voltage command update 244 is enabled, Vdpresheld* and Vqpresheld* are allowed to be updated with values coming from the current regulator Vdpres* and Vqpres* (e.g., Vdpresheld*=Vdpres*, and Vqpresheld*=Vqpres*). To clarify, Vdpreheld* is equal to Vdpres* as the method follows the no branch out of 310. In contrast, when the method 300 proceeds along the yes branch out of 310, at that point, Vdpreheld* is not updated anymore and it may not be equal to Vdpres*. Remember that Vdpreheld* will not be updated until the path is along the no branch out of 360 to 380

Some of the benefits of generating the voltage command signals in this manner will now be described with reference to FIGS. 4A-6C.

Figure 4A:
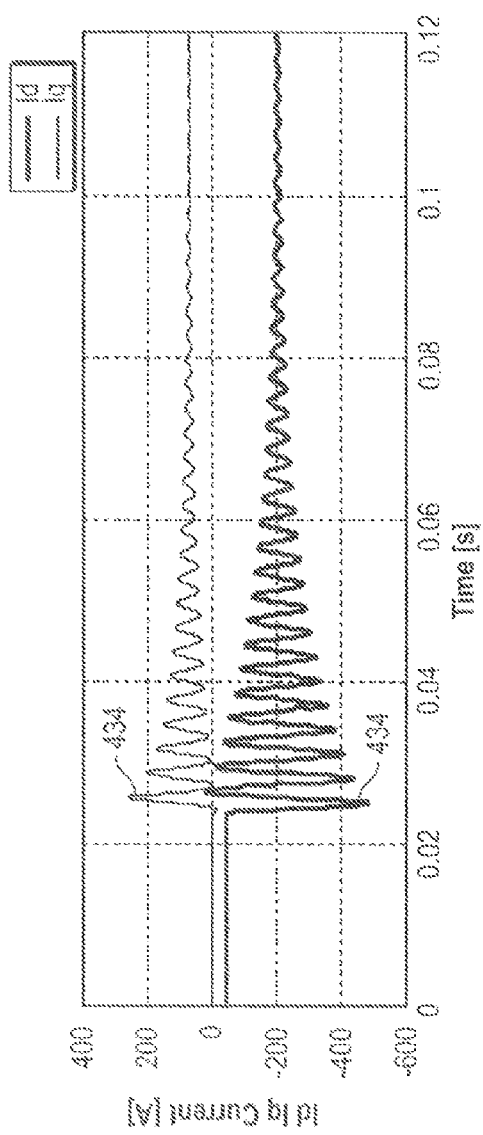
FIGS. 4A and 4C are simulation results that show stator current and torque responses to voltage commands of FIG. 4B that are generated using conventional techniques are used.
Figure 4B:
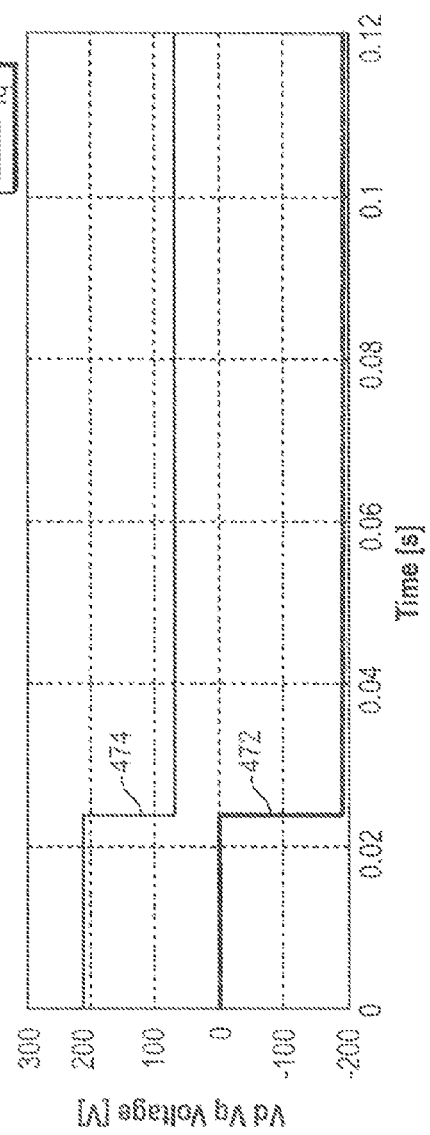
Figure 5B:
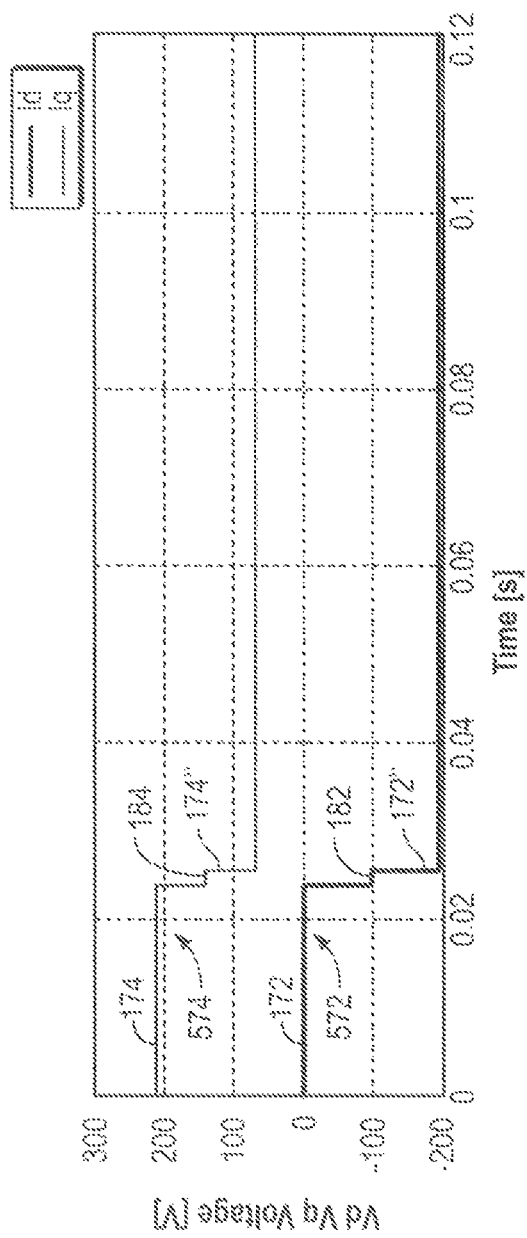
FIGS. 5A and 5C are simulation results that show stator current and torque responses to voltage commands of FIG. 5B that are generated in accordance the disclosed embodiments are implemented.
Figure 5C:
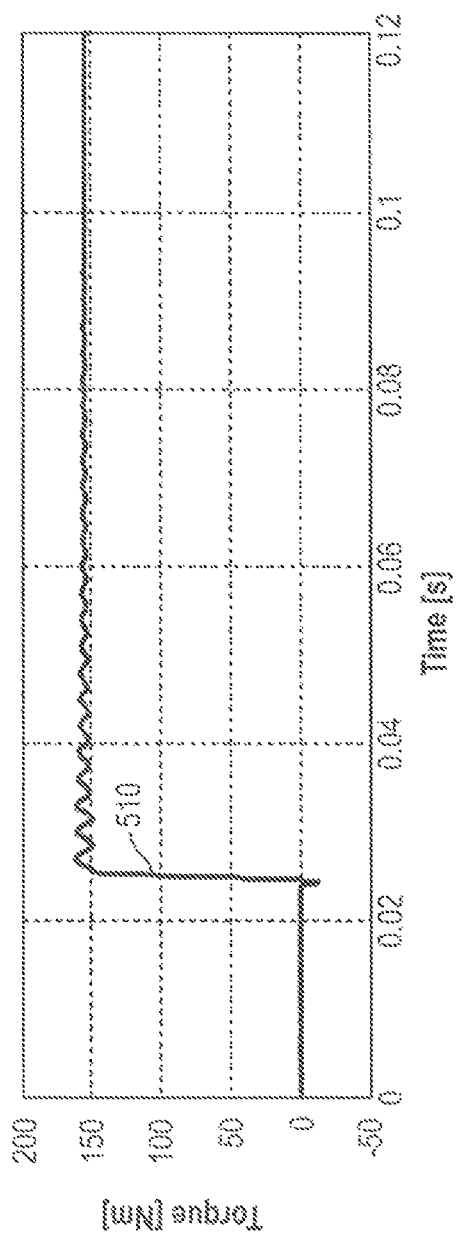

FIGS. 4A through 5C are simulation results that compare machine responses when voltage command signals are generated using conventional techniques versus when voltage command signals generated in a multi-step-wise manner accordance the disclosed embodiments. In particular, FIGS. 4A and 4C are simulation results that show stator current and torque responses to voltage commands of FIG. 4B (that were generated using conventional techniques under one exemplary set of simulation conditions). FIGS. 5A and 5C are simulation results that show stator current and torque responses to voltage commands of FIG. 5B (that were generated in accordance the disclosed embodiments are implemented under one exemplary set of simulation conditions). FIG. 6A shows waveforms from FIG. 4A superimposed on those from FIG. 5A, FIG. 6B shows waveforms from FIG. 4B superimposed on those from FIG. 5B, and FIG. 6C shows a waveform from FIG. 4C superimposed on the waveform of FIG. 5C.

FIG. 4A are graphs that show synchronous reference frame current signals (Id, Iq) 432, 434 as a function of time when there is a fault and a three-phase short response is applied at the PWM inverter module 110 and when the machine is operating at 4000 rpm and is generating a torque between 0 and 150 N*m. FIG. 4B are graphs that show conventionally generated synchronous reference frame voltage command signals (Vd*, Vq*) 472, 474 as a function of time. In other words, the synchronous reference frame voltage command signals (Vd*, Vq*) 472, 474 were generated using a conventional approach (when the disclosed embodiments are not applied), and both transition in a step-wise manner without an intermediate transition period (i.e., when the voltage command signals 472, 474 transition from a first value directly to a second value). The synchronous reference frame current signals (Id, Iq) 432, 434 result when conventional synchronous reference frame voltage command signals (Vd*, Vq*) 472, 474 that are illustrated in FIG. 4B are applied to control the machine 120. FIG. 4C is a graph that show output torque waveform 410 as a function of time. The output torque waveform 410 illustrates an example of the torque that is generated by the machine 120 when synchronous reference frame voltage command signals (Vd*, Vq*) 472, 474 are used to control the machine 120. Because the synchronous reference frame voltage command signals (Vd*, Vq*) 472, 474 transition rapidly in a step-wise manner (i.e., when the voltage command signals 472, 474 transition from a first value directly to a second value), the resulting synchronous reference frame current signals (Id, Iq) 432, 434 and output torque 410 are both oscillatory, which is undesirable. FIG. 4A through 4C demonstrate that conventional current regulators can have difficulty regulating current during a fast torque transient.

FIG. 5A are graphs that show synchronous reference frame current signals (Id, Iq) 532, 534 as a function of time (in accordance with one exemplary implementation the disclosed embodiments) when there is a fault and a three-phase short response is applied at the PWM inverter module 110 and when the machine is operating at 4000 rpm and is generating a torque between 0 and 150 N*m. FIG. 5B are graphs that show examples of synchronous reference frame voltage command signals (Vd*, Vq*) 572, 574 (as a function of time) that were generated in accordance in accordance with one exemplary implementation of the disclosed embodiments. The synchronous reference frame current signals (Id, Iq) 532, 534 result when synchronous reference frame voltage command signals (Vd*, Vq*) 572, 574 that are illustrated in FIG. 5B are applied to control the machine 120. FIG. 5C is a graph that show an example of an output torque waveform 510 as a function of time. The output torque waveform 510 is generated when synchronous reference frame voltage command signals (Vd*, Vq*) 572, 574 are used to control the machine 120.

As illustrated in FIG. 5B, when one implementation of the disclosed embodiments are applied, the synchronous reference frame voltage command signals (Vd*, Vq*) 572, 574 both transition from high-to-low in two separate steps (its noted that although the voltage command signals 572, 574 in FIG. 5B are illustrated as transitioning in two steps in this non-limiting example, in other implementations of the disclosed embodiments the voltage command signals can transition in multiple (e.g., more than two) steps). In other words, the voltage command signals 572, 574 output by the voltage command modification module 180 can have one of three different values: a first value when (1) the presently computed voltage command signals (Vdpres*, Vqpres*) 172, 174 are selected by the voltage command modification module 180, or a second value during a transition period when the (2) modified voltage command signals (Vd, Vq) 182, 184 are selected by the voltage command modification module 180, or a third value when (3) the held version of the presently computed voltage command signals (Vdpresheld*, Vqpresheld*) 172", 174" are selected by the voltage command modification module 180. Thus, as shown in FIG. 6C, the voltage command signals output by the voltage command modification module 180 are held at the second value for a transition period 575 that takes place at a first selection signal 241.

The voltage commands generated in accordance with the disclosed embodiments are generated in two steps, in which an under-damped PM machine is first excited by an initial voltage step (575) and then by at least one other "second" voltage step that is the held voltage, which is different in magnitude than the initial voltage step (and that is, for example, 180° phase-shifted of the machine natural frequency in comparison to the initial voltage step). In alternative implementations, the voltage command signals 572, 574 can have multiple transition periods instead of a single transition period 575 so that the voltage command signals undergo an integer number (N) of steps that is greater than 2, wherein the voltage steps will be (Vxpres*−Vxprev*)/N, and the step in time will be 1/(N*w)).

Thus, in one implementation, the voltage transition takes place in two steps: in the first voltage step the voltage command signals are effectively held at Vd and Vq (which are computed as (Vdpres*+Vdprev*)/2) and (Vqpres*+Vqprev*)/2), respectively) for the first half of 1/(2*ω), and in the second voltage step the voltage command signals are at held values (Vdpresheld*, Vqpresheld*) for the second half of 1/(2*ω), where ω is the synchronous frequency.

Because the modified voltage command signals (Vd, Vq) 572, 574 transition in this manner, the resulting synchronous reference frame current signals (Id, Iq) 532, 534 (FIG. 5A) and output torque 510 (FIG. 5B) are much less oscillatory in comparison to the corresponding signals in FIGS. 4A and 4B. Less oscillation is desirable for more robust current regulation and improved current transient response of the machine drive system, which increases machine efficiency and increases maximum power generated by the machine thereby improving utilization of the DC voltage source. This is particularly important in the field-weakening region (medium to high machine speed range, e.g., between 4,000 rpm and 10,000 rpm, and in some implementations between 3,000 rpm and 11,000 rpm), where the available voltage to control current is limited. In field-weakening region, it is desirable for the machine to operate at maximum voltage to increase/maximize power and efficiency, therefore, there is no voltage margin to regulate current during fast torque transients. The disclosed embodiments allow fast current and torque transient response at maximum voltage with minimum current and torque disturbance.

CONCLUSION

Thus, various embodiments have been described for controlling operation of a multi-phase machine. In accordance with the disclosed embodiments, a system and method are provided for generating voltage command signals for controlling an electric machine. The disclosed embodiments can improve existing drive systems by significantly improving the quality of current regulation by increasing current regulation robustness thus reducing current/torque oscillation. The voltage commands generated in accordance with the disclosed embodiments can improve current regulation robustness by improving current transient response during normal operation or when operating in the field-weakening region. The disclosed embodiments also improve existing machine drive systems by increasing machine efficiency and increasing maximum power generated by the machine and improving utilization of the DC voltage source.

When a fault condition occurs and the machine is operating in the field-weakening range, the voltage commands generated in accordance with the disclosed embodiments can also reduce or minimize phase current overshoot during the three-phase short transition (that is applied in response to detecting a fault condition) so that the three-phase short response is fast and is applied quickly at the inverter.

In addition, the disclosed embodiments can be implemented regardless of whether the system uses either closed-loop current control or open-loop voltage control techniques.

In some embodiments, the control mechanism changes from one that utilizes a closed-loop operating mode (e.g., with current regulation) to a mechanism that utilizes open-loop (voltage control) operating mode (e.g., without current regulation). A three-phase short transition represents one special case of open-loop voltage control.

During a closed-loop operating mode with current regulation (e.g., in field-weakening region), there is some voltage margin left, therefore the controller does not operate in accordance with a six-step operating mode. The disclosed embodiments can also allow the current regulator to operate at or near a six-step mode so that an increased/maximum voltage can be output from the inverter. For instance, when open-loop voltage control is used, torque can be controlled using a six-step mode with reduced/minimum current and torque disturbance during fast current and torque transient response.

The disclosed embodiments can allow for full six-step operation mode (when the system uses either closed-loop current control or open-loop voltage control techniques and when operating in field-weakening region, which is described above in accordance with some exemplary implementations).

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for generating voltage command signals for controlling an electric machine, the method comprising:
outputting, from a voltage command modification module, a plurality of different voltage command signals that comprise:
presently computed voltage command signals when a transient stator voltage satisfies at least two conditions;
modified voltage command signals when a timer value of a timer is determined to be less than or equal Co a first timer value, wherein the modified voltage command signals are computed based on held versions of the presently computed voltage command signals and previously computed voltage command signals; and
the held versions of the presently computed voltage command signals when the timer value of the timer is determined to be greater than or equal to the first timer value and is less than a second timer value.

2. A method according to claim 1, further comprising the steps of:
computing, at the voltage command modification module, the modified voltage command signals based on an average of the held versions of the presently computed voltage command signals and previously computed voltage command signals.

3. A method according to claim 1, further comprising:
receiving, at the voltage command modification module, an electrical angular frequency signal when the presently computed voltage command signals are received;
computing the first timer value as one-half of the inverse of the electrical angular frequency signal; and
determining, at the voltage command modification module, whether the timer value of the timer less than the first value.

4. A method according to claim 3, when the voltage command modification module determines that the timer value of the tinier is not less than the first timer value, further comprising:
determining, at the voltage command modification module, whether the timer value of the timer is less than the second timer value.

5. A method according to claim 4, further comprising:
computing the second timer value as the inverse of the electrical angular frequency signal.

6. A method according to claim 5, when the voltage command modification module determines that the timer value of the timer is not less than the second timer value, further comprising:
resetting, at the voltage command modification module, the timer for the voltage command update and clearing the timer-on flag; and
enabling the input for voltage command updates.

7. A method according to claim 1, wherein the at least two conditions are either:
when an absolute difference between a present value of a transient stator voltage magnitude and a previous value of a transient stator voltage magnitude is greater than a first threshold, or when an absolute difference between a present value of a transient stator voltage angle and a previous value of the transient stator voltage angle is greater than a second threshold.

8. A method according to claim 7, further comprising:
receiving, at the voltage command modification module when a timer-on flag is not set, the presently computed voltage command signals;
computing, at the voltage command modification module:
a present value of a transient stator voltage magnitude and a present value of a transient stator voltage angle based on the presently computed voltage command signals; and
a previous value of a transient stator voltage magnitude and a previous value of the transient stator voltage angle based on previously computed voltage command signals;
determining, at the voltage command modification module, whether the absolute difference between the present value of the transient stator voltage magnitude and the previous value of the transient stator voltage magnitude is greater than the first threshold, or the absolute difference between the present value of the transient stator voltage angle and the previous value of the transient stator voltage angle is greater than the second threshold;
starting a timer that is used to determine when voltage command signals are to be updated and setting the timer-on flag;
holding an input for voltage command updates when the timer-on flag is set.

9. A method according to claim 8, wherein the step of starting the timer, comprises:
starting the timer that is used to determine when voltage command signals are to be updated when the absolute difference between the present value of the transient stator voltage magnitude and the previous value of the transient stator voltage magnitude is greater than the first threshold, or when the absolute difference between the present value of the transient stator voltage angle and the previous value of the transient stator voltage angle is greater than the second threshold.

10. A method according to claim 1, wherein the voltage command signals have:
a first value when the presently computed voltage command signals are output,
a second value when the modified voltage command signals are selected and output, and
a third value then the held versions of the presently computed voltage command signals are selected and output,
wherein the voltage command signals are held at the second value during a transition period.

11. A system for generating voltage command signals controlling an electric machine, the system comprising:
a current regulator module configured to compute presently computed voltage command signals at a first time, and previously computed voltage command signals at a second time occurring prior to the first time;
memory for storing the previously computed voltage command signals and for holding a version of the presently computed voltage command signals as held versions of the presently computed voltage command signals;
a processor comprising a voltage command modification module that is configured to output voltage command signals, the voltage command modification module comprising:
a timer that is started in response to a start signal, wherein a timer-on flag is set in response to the start signal;
a voltage command selection signal generator module configured to generate a first selection signal when a timer value of the timer is determined to be less than a first timer value that is determined based on an electrical angular frequency signal, to generate a second selection signal when the timer value of the timer is determined to be greater than or equal to the first timer value and to be less than a second timer value that is determined based on the electrical angular frequency signal;

a voltage command modifier module configured to compute modified voltage command signals based on the held versions of the presently computed voltage command signals and previously computed voltage command signals;

a voltage command selection module configured to select and output a plurality of different voltage command signals that comprise:
- the presently computed voltage command signals in response to a third selection signal that is generated when a transient stator voltage satisfies at least one of condition;
- the modified voltage command signals in response to the first selection signal, and
- the held versions of the presently computed voltage command signals in response to the second selection signal.

12. A system according to claim 11, wherein the voltage command modifier module is configured to compute the modified voltage command signals based on an average of the held versions of the presently computed voltage command signals and the previously computed voltage command signals.

13. A system according to claim 11, wherein the voltage command selection signal generator module is configured to receive the electrical angular frequency signal, and to determine whether the timer value of the timer is less than the first timer value, wherein the first timer value is one-half of the inverse of the electrical angular frequency signal.

14. A system according to claim 13, when the voltage command selection signal generator module determines that the timer value of the timer is not less than the first timer value, wherein the voltage command selection signal generator module is further configured to determine whether the timer value of the tinier is less than the second timer value, and to generate the second selection signal when the timer value of the timer is determined to be less than the second timer value.

15. A system according to claim 14, wherein the second timer value is the inverse of the electrical angular frequency signal.

16. A system according to claim 15, wherein the voltage command selection signal generator module is configured to generate a reset signal and an input signal for enabling voltage command updates when the voltage command selection signal generator module determines that the timer value of the timer is not less than the second timer value, wherein the reset signal resets the timer and clears the timer-on flag.

17. A system according to claim 11, wherein the at least one condition is when an absolute difference between a present value of a transient stator voltage magnitude and a previous value of a transient stator voltage magnitude is not greater than a first threshold, or when an absolute difference between a present value of a transient stator voltage angle and a previous value of the transient stator voltage angle is not greater than a second threshold.

18. A system according to claim 17, wherein the stator voltage comparison module is further configured to compute a present value of a transient stator voltage magnitude and a present value of a transient stator voltage angle based on the presently computed voltage command signals; and a previous value of a transient stator voltage magnitude and a previous value of the transient stator voltage angle based on previously computed voltage command signals, and to determine whether the absolute difference between the present value of the transient stator voltage magnitude and the previous value of the transient stator voltage magnitude is greater than the first threshold, or the absolute difference between the present value of the transient stator voltage angle and the previous value of the transient stator voltage angle is greater than the second threshold, and wherein the stator voltage comparison module is configured to generate the start signal when the absolute difference the absolute difference between the present value of the transient stator voltage magnitude and the previous value of the transient stator voltage magnitude is greater than the first threshold, or when the absolute difference between the present value of the transient stator voltage angle and the previous value of the transient stator voltage angle is greater than the second threshold.

19. A system according to claim 11, wherein the voltage command signals output by the voltage command modification module have:
- a first value when the presently computed voltage command signals are output by the voltage command modification module,
- a second value when the modified voltage command signals are selected by the voltage command modification module, and
- a third value when the held versions of the presently computed voltage command signals are selected by the voltage command modification module,
wherein the voltage command signals output by the voltage command modification module are held at the second value during a transition period that takes place between the first selection signal and the second selection signal.

20. A processor comprising:
a voltage command modification module that is configured to output a plurality of different voltage command signals, comprising: presently computed voltage command signals when a transient stator voltage satisfies at least two conditions; modified voltage command signals when a timer value of a timer is determined to be less than or equal to a first timer value; and held versions of the presently computed voltage command signals when the timer value of the timer is determined to be greater than or equal to the first timer value and is less than a second timer value, wherein the voltage command modification module is configured to compute the modified voltage command signals based on the held versions of the presently computed voltage command signals and previously computed voltage command signals.

21. A system according to claim 18, when the absolute difference between the present value of the transient stator voltage magnitude and the previous value of the transient stator voltage magnitude is not greater than the first threshold, or when the absolute difference between the present value of the transient stator voltage angle and the previous value of the transient stator voltage angle is not greater than the second threshold, and wherein a voltage command modification module is configured to select and output the presently computed voltage command signals as the voltage command signals.

* * * * *